United States Patent [19]
Liang

[11] Patent Number: 6,100,798
[45] Date of Patent: Aug. 8, 2000

[54] TIRE PRESSURE DETECTING/WARNING APPARATUS

[76] Inventor: Shyh-Nan Liang, 2F-4, No.48 Feng Dong Road, Feng Yuan City, Taichung Hsien, Taiwan

[21] Appl. No.: 09/332,391

[22] Filed: Jun. 14, 1999

[51] Int. Cl.[7] .................................................. B60C 23/00
[52] U.S. Cl. ......................... 340/447; 340/442; 340/447; 340/58; 73/146.5
[58] Field of Search ................................... 340/442, 447, 340/58; 73/146.2, 146.5, 146.8

[56] References Cited

U.S. PATENT DOCUMENTS

| | | | |
|---|---|---|---|
| 4,090,172 | 5/1978 | Vesnic | 340/58 |
| 4,286,253 | 8/1981 | Nagy | 340/58 |
| 4,520,344 | 5/1985 | Shu et al. | 340/58 |
| 4,954,806 | 9/1990 | Hwang | 340/442 |
| 4,975,679 | 12/1990 | Ballyns | 340/442 |
| 5,856,619 | 1/1999 | Wang | 73/146.5 |

*Primary Examiner*—Jeffery A. Hofsass
*Assistant Examiner*—Phung Nguyen
*Attorney, Agent, or Firm*—Raymond Y. Chan; David and Raymond

[57] ABSTRACT

A tire pressure detecting/warning apparatus includes a main body mounted to a tire valve for introducing air pressure in the tire. The main body includes a first air passage and a second air passage. A first reed is mounted on the first air passage and is deformed to be in electrical contact with a first contact when the tire pressure is higher than a pre-determined relatively higher value of a safety range. A second reed is mounted on the second air passage and is deformed to be disengaged from a second contact when the tire pressure is lower than a pre-determined relatively lower value of the safety range. The tire pressure is too high if the first reed is in contact with the first contact, and the tire pressure is too low if the second reed is disengaged from the second contact. In either case, a radio-transmitting device sends a signal to a receiver in the vehicle, and a siren is activated to give a warning by sound or lamp that the pressure is too high or too low.

1 Claim, 5 Drawing Sheets

TIRE PRESSURE DETECTING/WARNING APPARATUS

BACKGROUND OF THE INVENTION

1. Field of the Invention

The present invention relates to a tire pressure detecting/warning apparatus, and more particularly to an apparatus that may detect tire pressure of a vehicle wheel when the vehicle is running and send a warning signal if the tire pressure is too high or too low.

2. Description of the Prior Art

The period of life of wheels and safety of vehicles largely depend on the tire pressure. Conventional tire pressure gauges can measure the tire pressure only when the vehicle is not moving, and the tire pressure is adjusted to be within an appropriate range (usually 28~32 psi). Nevertheless, the tire pressure might be out of the appropriate range as a result of a temperature rise or an alien object that pierces the tire when the vehicle is running. This unpredictable change causes potential risk to driving safety.

The present invention is intended to provide a tire pressure detecting/warning apparatus that may detect tire pressure at any time and warn the driver when the tire pressure is not within the safe range to thereby improve driving safety.

SUMMARY OF THE INVENTION

It is a primary object of the present invention to provide a tire pressure detecting/warning apparatus that may detect tire pressure at any time while the vehicle is still running and that may warn the driver when the tire pressure is not within the safe range to thereby improve driving safety.

It is a secondary object of the present invention to provide a tire pressure detecting/warning device that is simple in structure to improve sensitivity for practical use.

The above-mentioned objects are achieved by a tire pressure detecting/warning apparatus in accordance with the present invention that includes a main body adapted to be mounted to a tire valve for introducing air pressure in the tire. The main body includes a first air passage and a second air passage. A first reed is mounted on the first air passage and is deformed to be in electrical contact with a first contact when the tire pressure is higher than a pre-determined relatively higher value (e.g., 32 psi) of a safety range. A second reed is mounted on the second air passage and is deformed to be disengaged from a second contact when the tire pressure is lower than a predetermined relatively lower value (e.g., 28 psi) of the safety range. The tire pressure is too high if the first reed is in contact with the first contact, and the tire pressure is too low if the second reed is disengaged from the second contact. In either condition, a radio-transmitting device sends a signal to a receiver in the vehicle and a siren is activated to give a warning by sound or lamp that the pressure is too high or too low.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
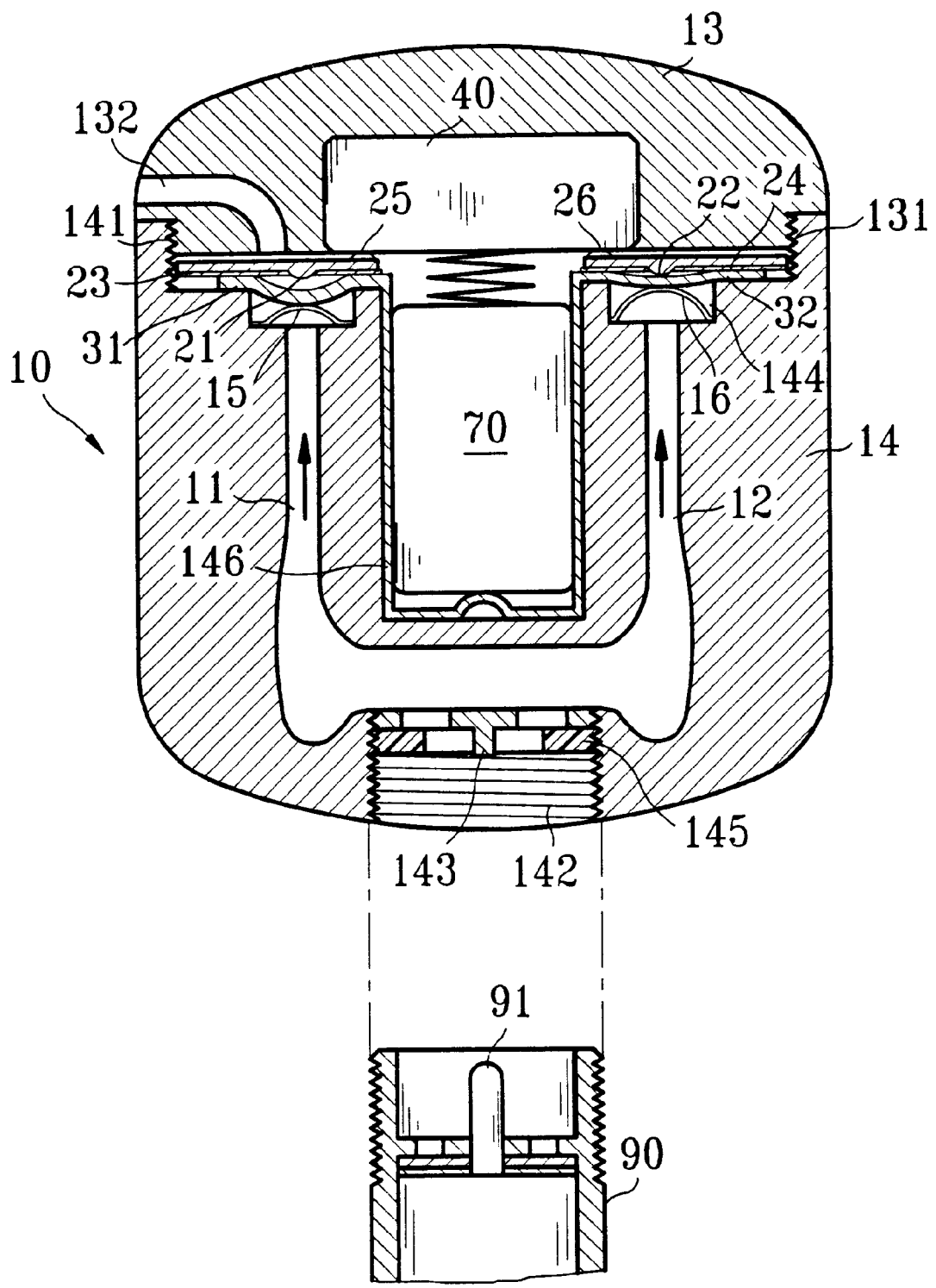
FIG. 1 is a sectional view of a tire valve and a tire pressure detecting/warning apparatus in accordance with the present invention, wherein the tire pressure detected is within a range between a pre-determined relatively higher value and a predetermined relatively lower value.
Figure 4:
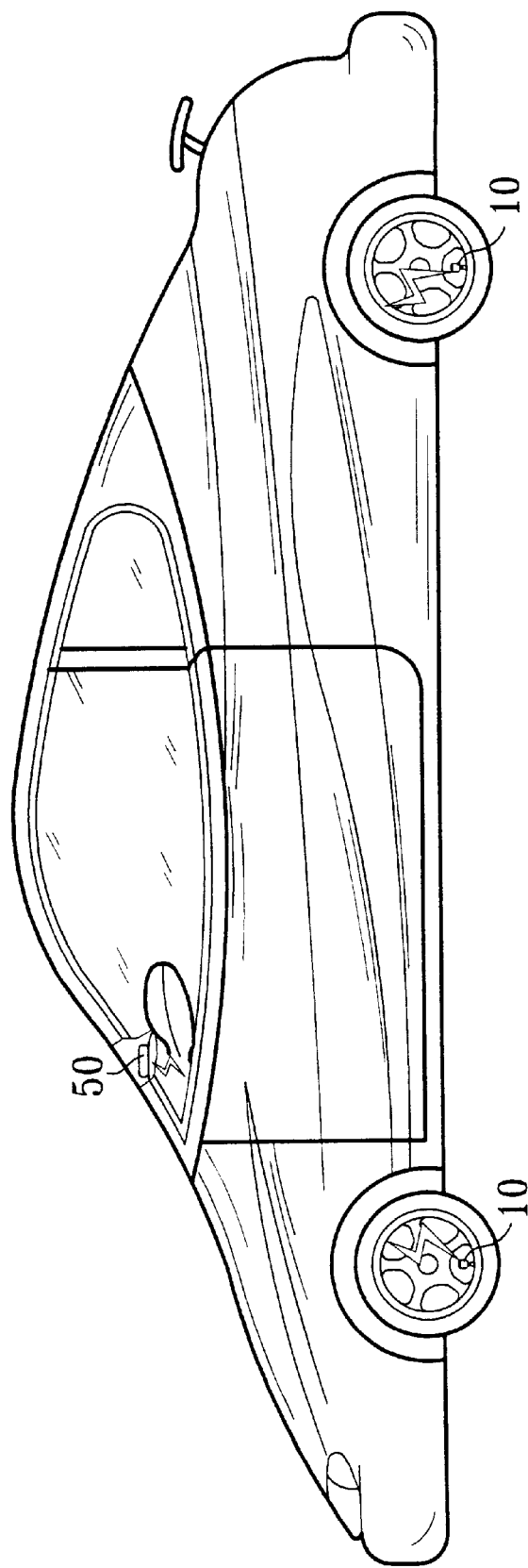
FIG. 4 is a schematic view illustrating application of the tire pressure detecting/warning apparatus to an automobile.

Referring to FIG. 1, a tire pressure detecting/warning apparatus in accordance with the present invention includes a main body 10 adapted to be mounted to a tire valve 90 for introducing air pressure in the tire (not shown) of a vehicle tire (not shown). The main body 10 includes a first air passage 11 and a second air passage 12. A first reed 31 is mounted on the first air passage 11 and is deformed to be in electrical contact with a first contact 21 when the tire pressure is higher than a pre-determined relatively higher value (e.g., 32 psi) of a safety range. A second reed 32 is mounted on the second air passage 12 and is deformed to be disengaged from a second contact 22 when the tire pressure is lower than a pre-determined relatively lower value (e.g., 28 psi) of the safety range. Namely, the tire pressure is too high if the first reed 31 is in contact with the first contact 21, and the tire pressure is too low if the second reed 32 is disengaged from the second contact 22. In either condition, a radio-transmitting device 40 sends a signal to a receiver 50 (FIGS. 4 and 5) in a vehicle, and a siren 60 is activated to give a warning that the pressure is too high or too low by sound or lamp.

Still referring to FIG. 1, the main body 10 includes an upper lid 13 and a lower seat 14. The upper lid 13 includes an outer threading 131 in a lower portion thereof and an air pressure balancing hole 132 for introducing ambient air into the main body 10. The lower seat 14 includes a stepped inner wall 144 in an upper portion thereof and an inner threading 131 above the inner wall 144 for engaging with outer threading 131 of the upper lid 13. A screw hole 142 communicated with the first and second air passages 11 and 12 is defined in a bottom of the lower seat 14 so as to threadedly engage with the tire valve 90. A leakproof rubber gasket 145 and a tappet 143 are mounted in the screw hole 142, wherein the tappet 143 may push a check valve 91 in the tire valve 90 to an opened position such that air inside the tire enters the first and second air passages 11 and 12 via the screw hole 142. In addition, a first flexible diaphragm 15 and a second flexible diaphragm 16 are mounted on and thus block the first air passage 11 and the second air passage 12, respectively to avoid leakage of air. The lower seat 14 further includes a cylindrical compartment 146 in a center thereof.

Figure 5:
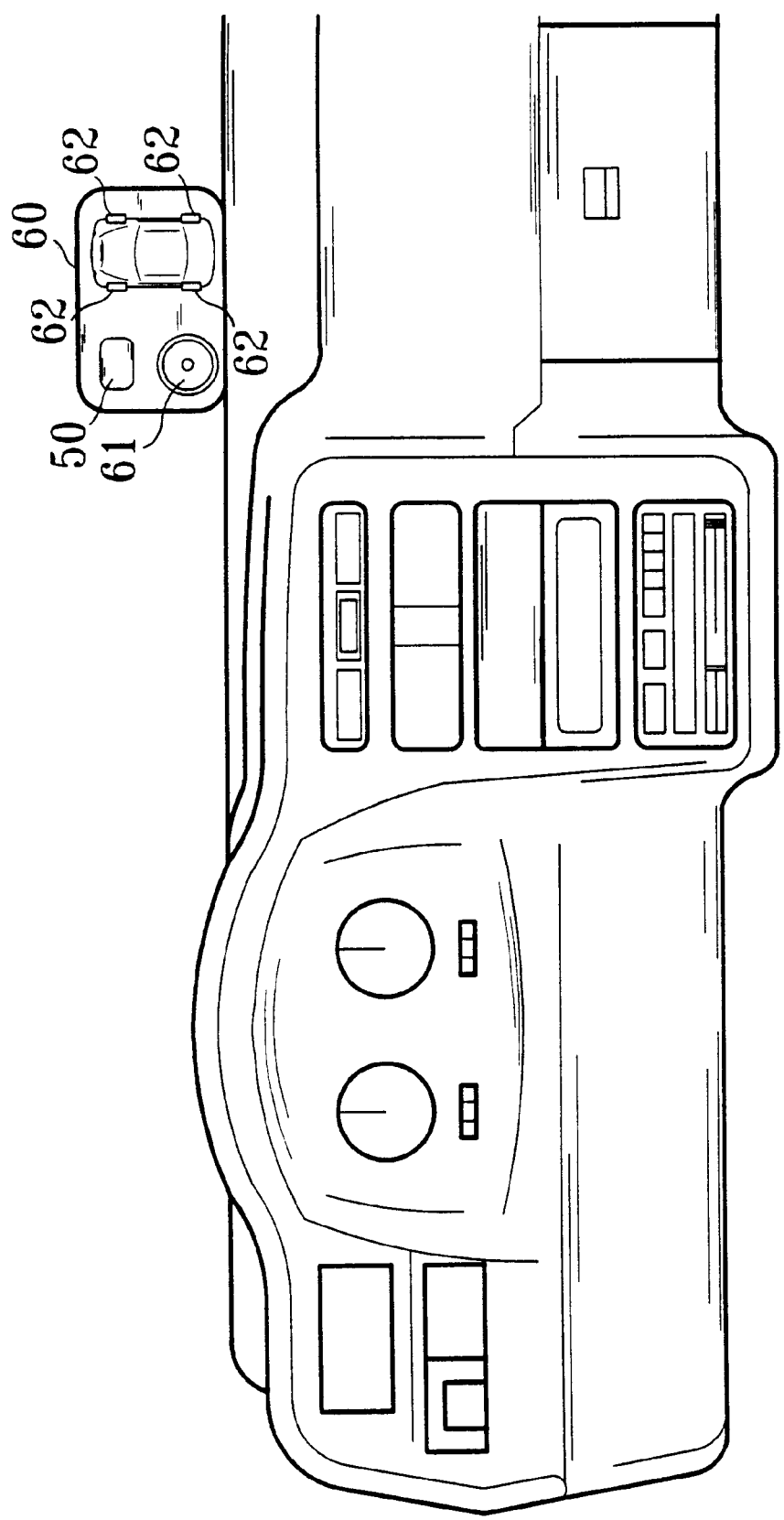
FIG. 5 is a schematic view illustrating arrangement of a receiver and a siren of the tire pressure detecting/warning apparatus in accordance with the present invention.

The radio-transmitting device 40 is mounted in the upper lid 13 and includes a control circuit for sending a signal to a receiver 50 in the automobile (FIG. 5).

The reeds 31 and 32 are preferably integrally made of conductive material to form a substantially U-shaped metal plate that is received in the compartment 146 of the lower seat 14. Two distal ends of the U-shaped metal plate extend outward away from each other to from two flexible arcuate reeds of different thickness. The first reed 31 on the first air passage 11 is thicker while the second reed 32 on the second air passage 12 is thinner so as to deform in response to different air pressure.

A first electrical insulating member 23 and a second electrical insulating member 24 are mounted above the first reed 31 and the second reed 32, respectively in a manner that only the first contact 21 of the whole first conductive plate (not labeled) above the member 23 and the second contact 22 of the whole second conductive plate (not labeled) above the member 24 are capable of being in contact with the first and the second reeds 31 and 32, respectively. The first and second contacts 21 and 22 are in electrical connection with a third contact 25 and a fourth contact 26 of the radio-transmitting device 40.

A battery unit 70 is mounted in the compartment 146 of the lower seat 14 and in electrical contact with the first and second reeds 31 and 32 for supplying power to the radio-transmitting device 40.

Referring to FIG. 1, when the tire pressure is within the normal safety range (e.g., 28~32 psi), the reeds 31 and 32 do not deform. Thus, the first reed 31 does not contact with the first contact 11, and the second reed 32 contacts with the second contact 12. Accordingly, no signal is sent by the radio-transmitting device 40 to activate the siren 60 under control by the control circuit of the radio-transmitting device 40.

Figure 2:
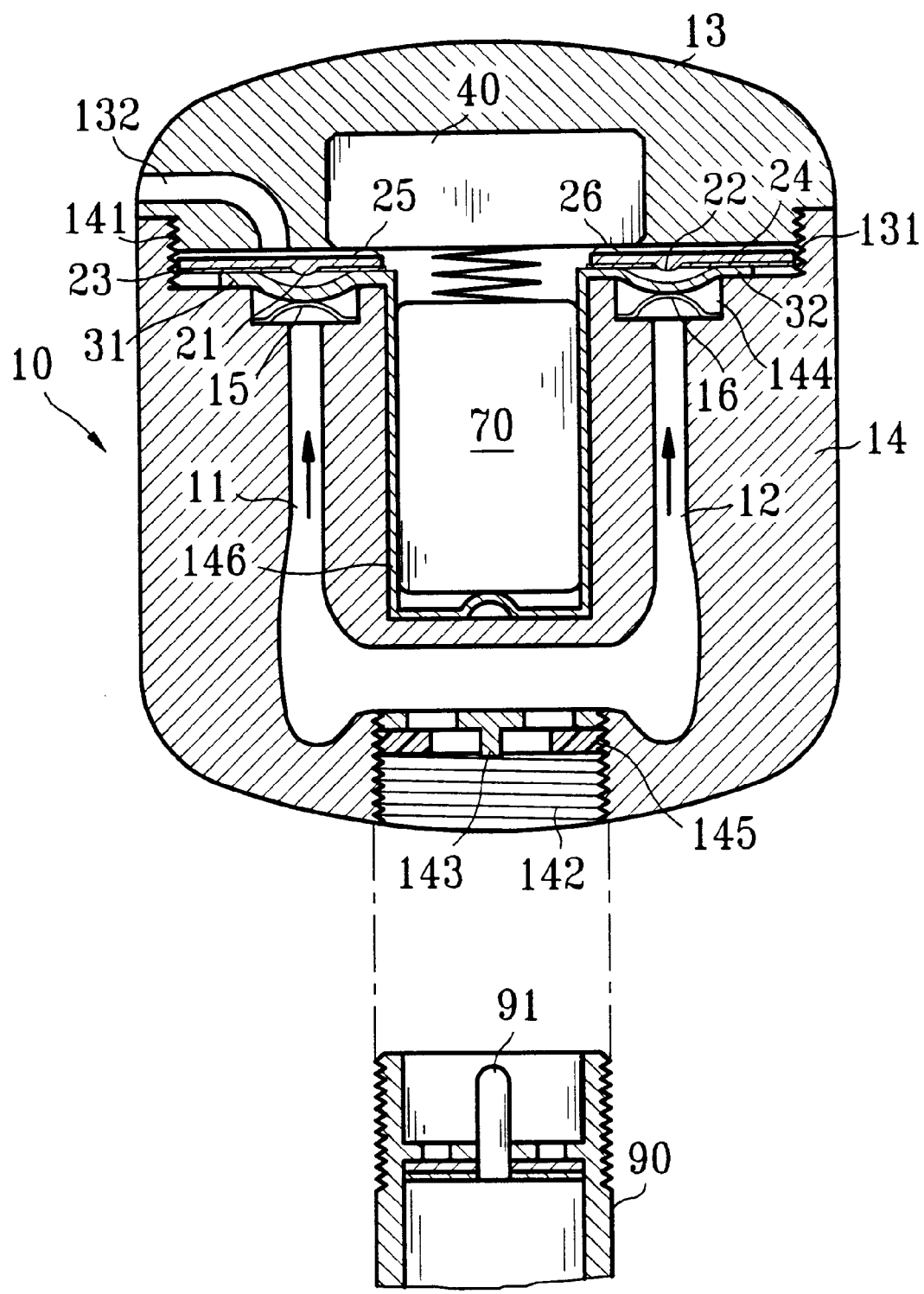
FIG. 2 is a sectional view similar to FIG. 1, wherein the tire pressure is lower than the pre-determined relatively lower value.

Referring to FIG. 2, when the tire pressure is lower than 28 psi, the first reed 31 is not deformed since it is designed to deform when the air pressure is higher than 32 psi. Yet, the second reed 32 deforms. Thus, the first reed 31 does not contact with the first contact 11, and the second reed 32 disengages from the second contact 12. Accordingly, a signal representing insufficient pressure is sent by the radio-transmitting device 40 to activate the siren 60 under control by the control circuit of the radio-transmitting device 40. The siren 60 may warn the driver by sound or flashing lamp that the tire pressure is too low, and the problem can be immediately handled.

Figure 3:
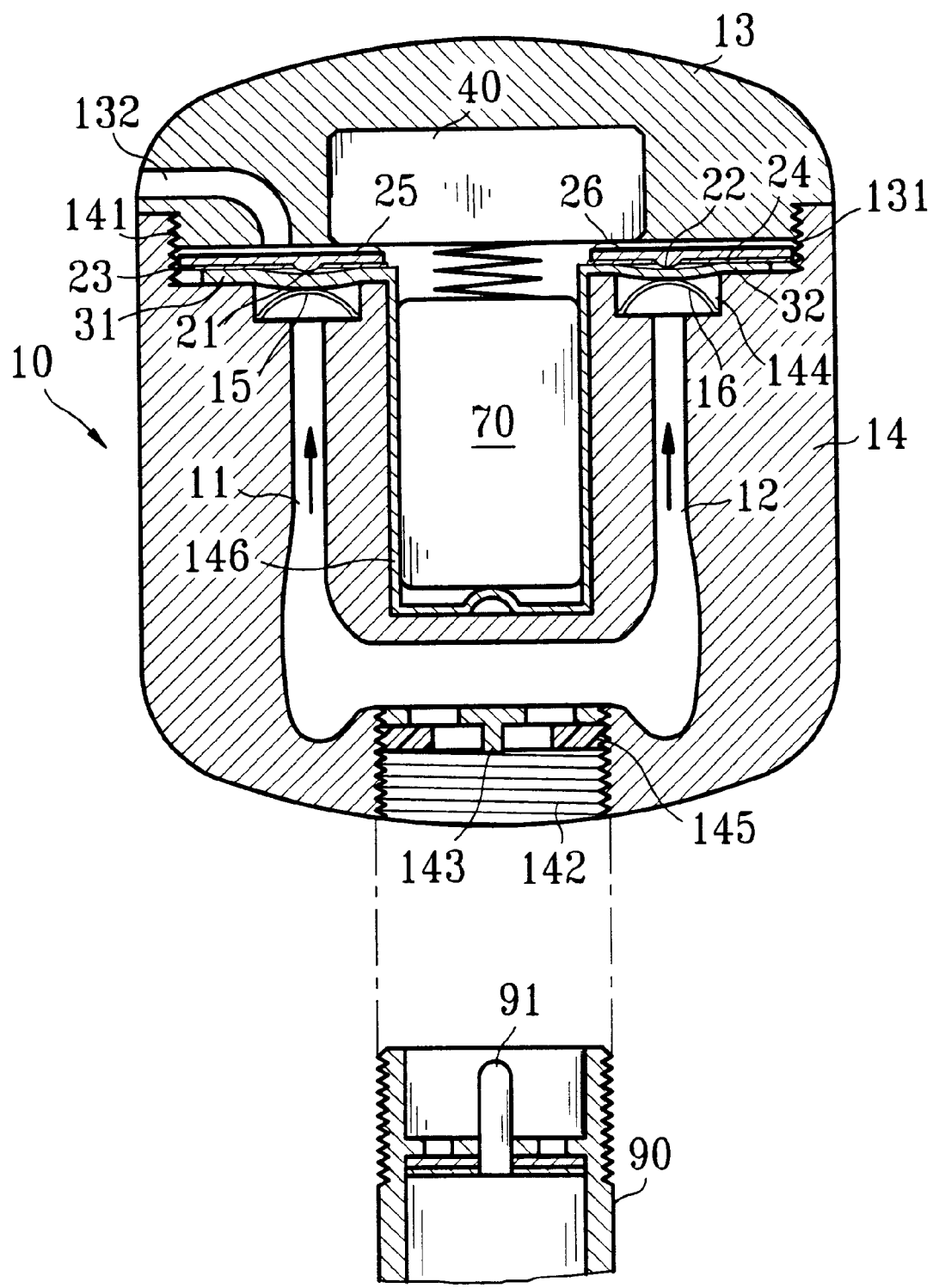
FIG. 3 is a sectional view similar to FIG. 1, wherein the tire pressure is higher than the pre-determined relatively higher value.

Referring to FIG. 3, when the tire pressure is higher than 32 psi, the second reed 32 is not deformed since it is designed to deform when the air pressure is lower than 28 psi. Yet, the first reed 31 deforms. Thus, the first reed 31 is in electrical contact with the first contact 11, and the second reed 32 does not contact with the second contact 12. Accordingly, a signal representing overpressure of the tire is sent by the radio-transmitting device 40 to activate the siren 60 under control by the control circuit of the radio-transmitting device 40. The siren 60 may warn the driver by sound or flashing lamp that the tire pressure is too high, and the problem can be handled immediately.

As can be seen from FIG. 5, the receiver 50 and the siren 60 are mounted to the dashboard (not labeled) of an automobile. The siren 60 may include a buzzer 61 that sounds in different manners to indicate pressure conditions of the tire (normal, too high, or too low). The siren 60 may also include a number of light emitting diodes (LED) 62 of different color that represent different pressure conditions, thereby indicating pressure conditions of the tire (e.g., green for normal, yellow for too high, and red for too low).

Accordingly, the tire pressure detecting/warning apparatus in accordance with the present invention is simple in structure, yet the sensitivity of tire pressure detection is improved. Of more importance, tire pressure detection may be proceeded even if the automobile is running and the driver is warned once abnormal tire pressure is detected.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tire pressure detecting/warning apparatus, comprising:

a main body adapted to be mounted to a tire valve of a tire of a vehicle, said main body including a first air passage and a second air passage;

a first contact and a second contact;

a first reed mounted on said first air passage and not in electrical contact with said first contact when a tire pressure of said tire is within a predetermined safety range between a relatively higher value and a relatively lower value, said first reed being deformed to be in electrical contact with said first contact when said tire pressure is higher then said relatively higher value of said predetermined safety range;

a second reed mounted on said second air passage and in electrical contact with said second contact when said tire pressure of said tire is within said predetermined safety range, said second reed being deformed to be disengaged from said second contact when said tire pressure is lower than said relatively lower value of said predetermined safety range, wherein said first reed and said second reed are integrally made of conductive material and said first reed has a thickness greater than that of said second reed;

a radio-transmitting device mounted in said main body for transmitting a first signal representing insufficient pressure of said tire when said second reed disengages from said second contact and for transmitting a second signal representing overpressure of said tire when said first reed engages with said first contact;

a receiver for receiving said first signal and said second signal from said radio-transmitting device; and a siren for generating different warning sounds and lamp indications in response to said first signal and said second signal received by said receiver.

* * * * *